June 7, 1960 E. V. CRANE ET AL 2,939,973
TORQUE TRANSMITTING MECHANISM
Filed Oct. 10, 1956 3 Sheets-Sheet 2
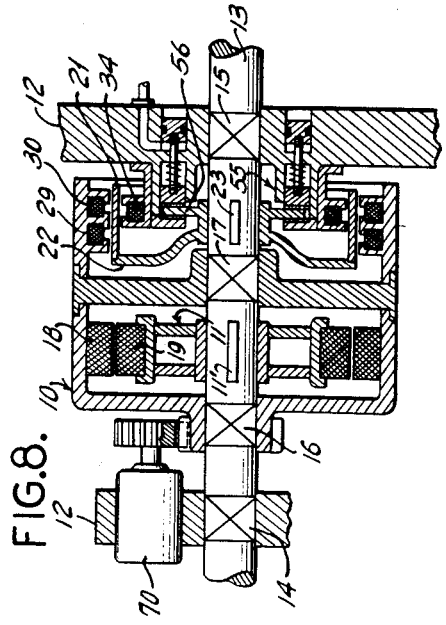
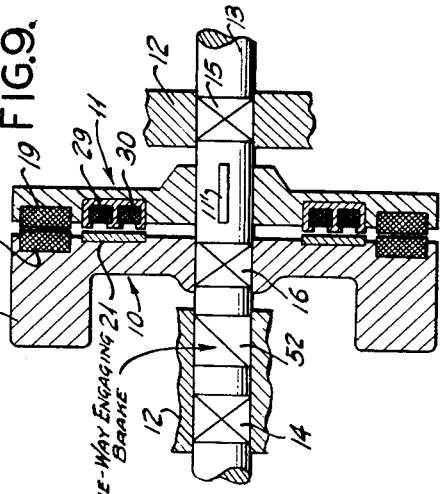
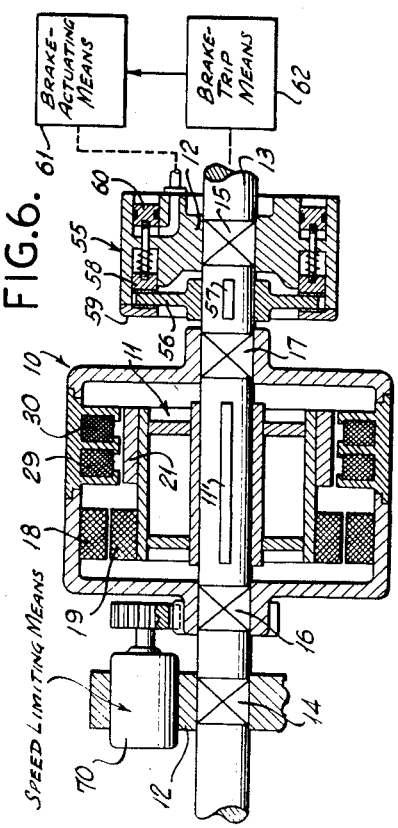
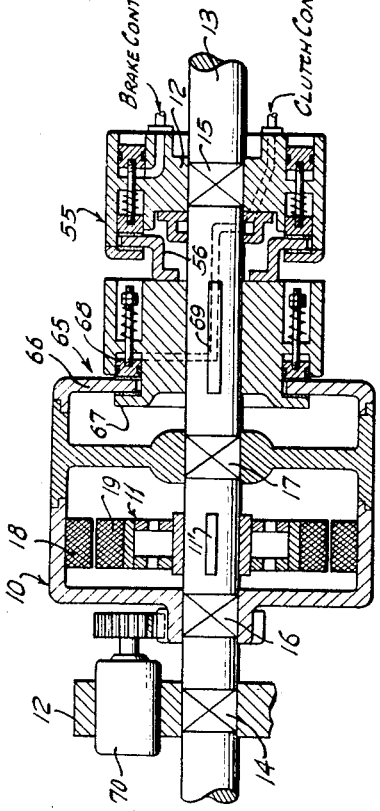
INVENTORS
EDWARD V. CRANE
FRANK P. FEHN SR
BY
ATTORNEYS June 7, 1960 E. V. CRANE ET AL 2,939,973
TORQUE TRANSMITTING MECHANISM
Filed Oct. 10, 1956 3 Sheets-Sheet 3

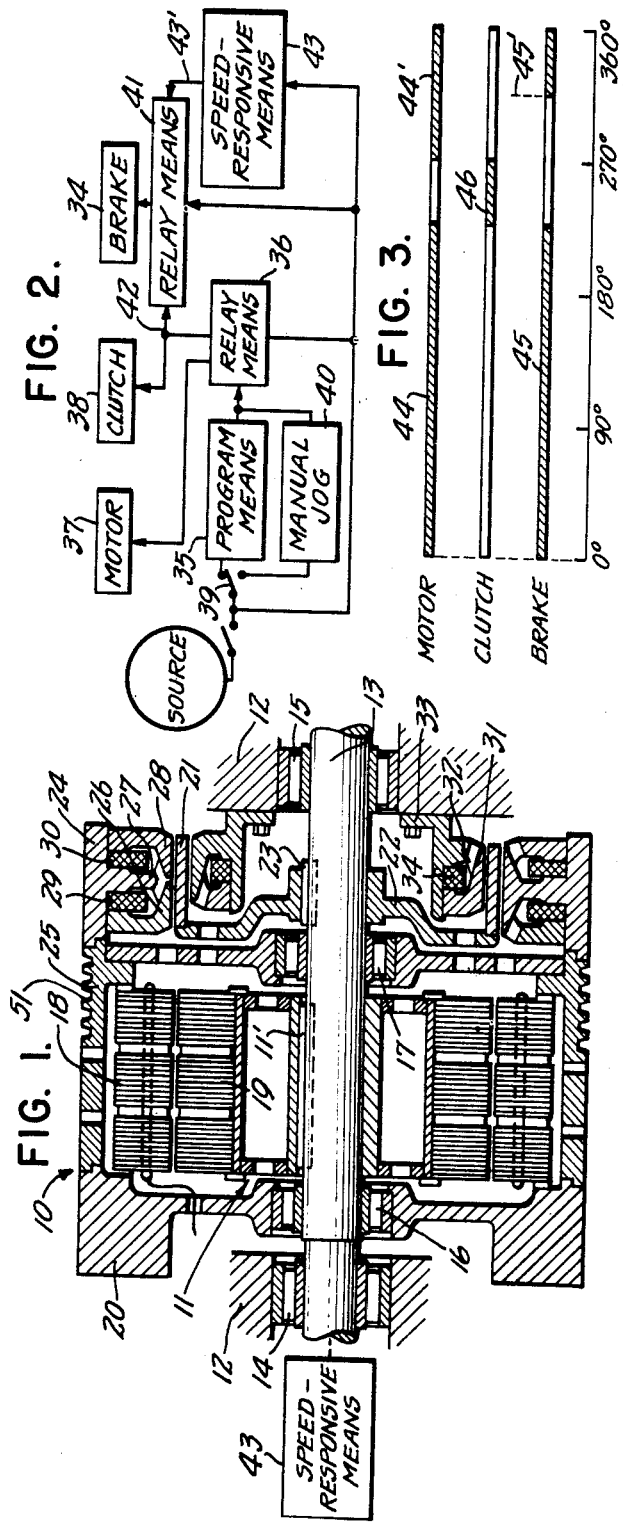
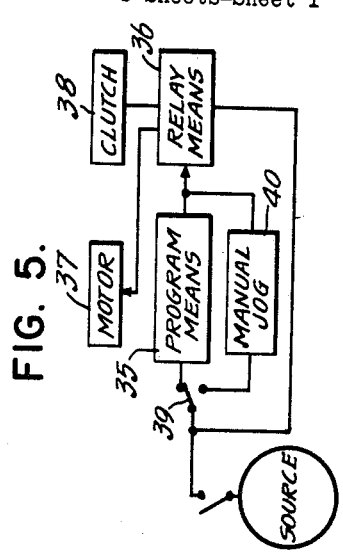

INVENTORS
EDWARD V. CRANE
BY FRANK P. FEHN SR
Williams & Tilbury
ATTORNEYS

United States Patent Office 2,939,973
Patented June 7, 1960

2,939,973
TORQUE TRANSMITTING MECHANISM

Edward V. Crane and Frank P. Fehn, Sr., Canton, Ohio, assignors to E. W. Bliss Company, Canton, Ohio, a corporation of Delaware Filed Oct. 10, 1956, Ser. No. 615,153

26 Claims. (Cl. 310—95)

This invention relates to a prime mover or torque transmitter of the type capable of delivering transient high torques, as when periodically clutching a load to a flywheel.

The principle of the flywheel is old and well understood, and its energy-storing characteristics are admirably suited for the operation of many types of present-day industrial machines. The flywheel and its associated mechanisms are normally utilized to smoothly translate stored flywheel energy into work-producing torque of various kinds. To the accomplishment of the foregoing, it has been customary to mount the flywheel idly on a backshaft, drive shaft, or the like, which is rendered rotatable thereon by means of a prime mover such as a small electric motor, belt-connected to the outer periphery of the flywheel. Normally, clutch means are also incorporated between the shaft and the flywheel, whereby engagement may be made intermittently therebetween, by air pressure, electro-magnetic forces, or the like. A mechanical brake of some commercially accepted variety is usually adapted automatically to engage the shaft to hold it against rotation whenever the clutch is de-energized to disconnect the flywheel from the shaft.

When it has been desirable to operate a machine at more than one speed, speed-reduction gear systems have been incorporated with the clutches; gearing or other separate additional mechanism has been necessary if reversible output has been needed. It is also important in some cases that machines be protected against sudden and/or unexpected overloads; to this end, special load-protecting devices have been incorporated into the power train, such as overload clutches and the like, which will disengage under a predetermined critical load to release the flywheel-torque input.

In summation, therefore, the more important accessories to the modern flywheel which are employed separately or in combination to operate certain types of heavy industrial machines include: a flywheel prime mover, a clutch, a brake, a speed-change and/or reverse drive mechanism, and an overload-protection device.

In view of the foregoing, it is a general object of the present invention to provide an improved and novel torque-transmitting mechanism which will perform all of the functions of the mechanisms set forth in summation hereinabove, and will provide these functions with improved performance.

It is a primary and important object of the invention to provide novel means to energize the above-mentioned torque-transmitting mechanism, wherein said mechanism is enabled to function in a superior manner to perform the tasks of the above-recited flywheel accessories, without requiring additional mechanism.

It is also an object to provide a device of the above character wherein the requirement for braking to the frame is reduced to an absolute minimum.

Another object of the invention is to provide a self-contained mechanism developing its own prime-moving torques and providing a substantial flywheel action to which output torques may be periodically clutched.

It is a specific object to achieve the above objects with the structure utilizing, to the greatest extent possible, components which are readily commercially available.

Further objects of the invention include the provision of a flywheel device which also functions as a clutch and brake and yet requires no more space than a conventional flywheel; the provision of torque-transmitting means which may be controlled to function as an overload-protection device; the provision of a novel device adapted to provide energy-conserving clutching and braking; the provision of a novel device adapted to perform the functions of a motor, flywheel, clutch, brake, reverse gear, and overload-protection mechanism in a superior manner and with a minimum of wear and maintenance; the provision of a novel combination motor, flywheel, clutch, brake, and overload-protection device which is amenable to more precise control, which is relatively inexpensive to manufacture, and which has a minimum of mechanical wearing contact between parts.

Other objects and various further features of novelty and invention will be pointed out or will occur to those skilled in the art from a reading of the following specification in conjunction with the accompanying drawings. In said drawings, which show for illustrative purposes only, preferred forms of the invention:

Figure 1 is a sectional view, taken along the axis of a prime mover representing an embodiment of the invention;

Figure 2 is a simplified electrical diagram schematically indicating the connection of control elements for the structure of Figure 1;

Figure 3 is a graphical diagram depicting relative timing of various elements of the structure of Figure 1 in a typical cycle of operation;

Figure 4 is a simplified longitudinal sectional view of an alternative form of the invention;

Figure 5 is an electrical diagram schematically indicating control functions for the device of Figure 4;

Figures 6 to 9 are simplified longitudinal sectional views of further alternative forms;

Figure 10:
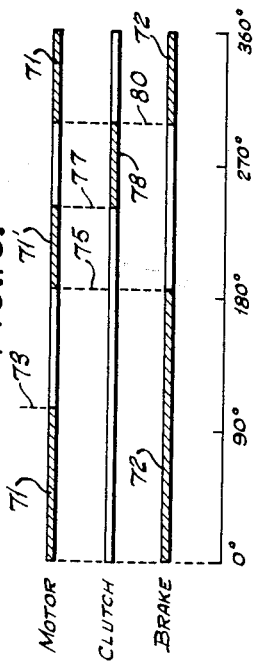
Figure 10 is a diagram similar to Figure 3 and depicting relative timing for another mode of operation for the various forms of our invention; and, Figure 11 is an electrical diagram similar to Figure 2 but illustrating controls for the selective provision of the modes of operation of Figures 3 and 10.

Briefly stated, our invention contemplates the employment of two relatively rotatable members, each of which is mounted for rotation about the same axis in a suitable support or frame. In the forms to be described, one of these members, which may be termed the input member, is of relatively great moment of inertia and constitutes the flywheel, and output torques are taken from the other rotatable member (output member). Coacting electric-motor elements are carried by both members; coacting clutch elements are also carried by both members, and means are provided for holding one (output) of the members against rotation in at least one direction so that, upon excitation of the motor elements, the other (input) member may be driven relatively to the frame so as to develop maximum flywheel (angular) momentum.

In one mode of operation, output torques are developed by transiently de-energizing the motor elements and by simultaneously actuating the clutch elements; we call this positive-torque transmission because output torque is basically in the same direction (or sense) as the flywheel momentum of the input member. After delivery of the desired transient "positive" torque to the load, the clutch elements are disengaged, and the motor elements re-energized so that the flywheel may be reaccelerated at the same time as the output member is decelerated. The holding means is effective to retain the output member against rotation, once motor action has brought the output member substantially to a standstill.

In another mode of operation, which we term negative-torque transmission, output torque is basically in the direction (or sense) opposite to that of the flywheel momentum. The normal momentum of the flywheel is based on a motor-element speed representing less than "full" (or maximum) motor speed. "Negative" output torques are developed by transiently further energizing the motor elements while the clutch elements are not actuated. After delivery of the desired transient "negative" torque to the load, the motor elements are de-energized, and the clutch elements are actuated so that the flywheel may be decelerated at the same time as the output member is also decelerated. The holding means may again be effective to retain the output member against rotation, once clutch action has brought the output member substantially to a standstill.

Referring to Figure 1 of the drawings, our invention is shown in application to a flywheel device comprising inner and outer members 10—11 rotatable relatively to each other, and both being rotatable relatively to the frame 12. In the form shown, the inner rotatable member is keyed at 11' to a shaft 13 from which output torques are available. The shaft 13 is journalled at bearings 14—15 in the frame 12, and the outer rotatable member 10 is journalled at bearings 16—17 on the shaft 13.

As indicated generally above, coacting electric-motor elements are carried by each of the relatively rotatable members 10—11. In the form shown, these elements comprise field windings and laminations 18 carried by the outer rotatable member 10, and armature laminations and windings 19 carried by the inner rotatable member 11. The inner and outer windings may be of any variety to develop rotational torque between the two members 10—11, and electrical connections may be made by way of slip-rings and/or commutator means (not shown), as is common practice. By this we mean that the motor elements may constitute parts of an otherwise conventional D.-C. or A.-C. motor; however, in the drawings, we indicate schematically the employment of a three-phase induction-motor construction, in which the motor element 19 on the inner rotational member 11 is either of the squirrel-cage or wound rotor variety, three-phase excitation being applied to the outer motor element 18. Since the outer rotatable member 10 is to constitute the flywheel from which rotational energy is to be transiently extracted, we show the formation of member 10 with very substantial moment of inertia about the rotation axis, as, for example, by provision of a large annular mass 20 at maximum radius of the member 10.

As also indicated generally above, the inner and outer rotatable members 10—11 additionally carry coacting clutch elements. In the form shown, these clutch elements comprise parts of a so-called eddy-current clutch, employing an eddy-current disc 21; disc 21 may be carried by a support member 22 keyed at 23 to the shaft 13 and, therefore, effectively forming a part of the inner rotatable element 11. Other elements of the clutch are carried by the outer rotatable member 10 and are shown to comprise a ring member 24 secured to the drum 25 of outer member 10 and supporting magnetic-circuit pole structure 26—27—28, for the establishment of flux paths linked to the eddy-current disc 21. The flux paths are excited by energizing windings 29—30.

To complete the general organization of Figure 1, we further show brake elements coacting between the inner rotatable member 11 and the frame 12, and it is convenient to employ eddy-current brake action utilizing the same eddy-current disc 21 as described for the clutch. The brake structure carried by the frame 12 may thus comprise poles 31—32 on a bracket member 33 and excited when winding means 34 is energized.

Control mechanism and a typical cycle of operation for the device of Figure 1 are illustrated in Figures 2 and 3, respectively. For automatic operation, reliance may be had upon recycling program means 35 for one or more relay means 36, determining excitation of the motor elements 37 in alternation with the clutch element 38; the motor element 37 will be understood to represent the structure defined at 18—19 in Figure 1, and the clutch elements 31 will be understood to represent the structure at 21—29—30 in Figure 1. If desired, a selector switch 39 may be actuated to enable a manual-jog control 40 for the relay means 36. The brake means 34 is shown actuated through separate relay means 41, having a first control connnection 42 functioning from the clutch-control relay 36 and a second control connection 43' functioning from speed-responsive means 43. In Figure 1, the speed-responsive means 43 is shown mechanically connected to the output shaft 13 and is preferably so arranged that, when the speed of the shaft 13 reaches zero (or substantially zero), the relay 41 is activated to apply excitation voltage to the brake winding 34.

In operation, the brake means 34 is applied when the motor 37 is first excited, i.e., when started from rest. This produces a frame-referenced torque on the outer motor element 18, so as to develop maximum speed of rotation in the outer or flywheel element 10, until such time as output torque is to be delivered by way of shaft 13. This time will be determined either by the program means 35 or by the manual-jog control 40, depending upon the manner in which the machine is to operate. Under control of one of the means 35 and 40, relay means 36 is effective to disconnect the motor 37 and brake 34, and simultaneously to engage the clutch 38; these functions are graphically depicted in Figure 3, wherein the shaded bar 44 represents excitation of the motor, wherein the shaded bar 45 represents excitation of the brake, and wherein the shaded bar 46 represents excitation of the clutch.

Clutch action is such as to substantially bind the inner and outer rotatable parts 10—11 to each other and thus to transfer flywheel momentum directly to the shaft 13. The length of time during which such momentum is transferred may be determined by a variety of means, but in the form shown, the program means 35 is sufficiently suggestive of predetermined or automatically determined transient clutching action. As soon as the clutching period is over, relay means 36 is actuated (by means 35 or 40) to re-excite motor 37 and to de-energize clutch 38; this function is suggested by the bar 44' in Figure 3.

Now, as an inherent result of operating the clutch 38, some of the momentum of the flywheel 10 is lost (i.e., transferred to the load) so that there will be some speed reduction in the flywheel 10. At the same time, there will have been a development of speed and momentum in the inner rotatable member 11, meaning, of course, all parts keyed together with the inner member, including parts of the load (not shown). Therefore, upon de-energizing the clutch 38, the flywheel will be revolving at less than maximum speed, and the inner rotatable member 11 will be rotating at some speed. Re-excitation of the motor develops relative torques between elements 18—19 in the direction to reduce the speed of rotation of the inner rotatable member 11—13 and to reaccelerate the flywheel. Since the effective moment of inertia of the flywheel preferably substantially exceeds that of the inner rotatable parts 11—13 (including that of the effective load), the motor 37 is able to reduce to zero (and thus effectively to brake) the output shaft 13 while reaccelerating the flywheel. The speed-responsive means 43 automatically detects the achievement of substantially zero speed and, upon such detection, is effective to cause relay 41 to re-excite the brake 34.

In Figure 3, we suggest by dashed line 45' that the instant of reapplication of the brake 34 is a somewhat indeterminate time, but that it clearly follows the instant at which the clutch is de-energized and the motor re-excited. Once having reapplied the brake 34, a firm reference to the frame 12 is re-established, and what speed remains to be developed in the flywheel 10 can be readily regained before the next clutching phase occurs. It is of fundamental importance to the invention that the brake 34 shall not be excited until such time as maximum utilization is made of the motor 37 to accomplish braking action on the shaft 13 and at the same time to accomplish a substantial reacceleration of the flywheel 10.

In connection with Figures 1 and 2 it will be noted that the device is completely reversible, that is, that the clutch 38 and brake 34 do not depend upon a particular direction of rotation of motor 37 in order to perform their respective functions. This means that the electric circuitry may include polarity or field-reversing mechanism, whereby direction of motor rotation may be selected. Such mechanism is not shown but will be understood as implicit in the type or organization described for Figures 1 and 2.

On the other hand, in the arrangement of Figure 4, the mechanism is adapted to uni-directional torque output and this simplification makes possible elimination of the brake 34. In the arrangement of Figure 4 several of the parts may be the same as described for Figure 1 and have been given the same reference numbers. The inner and outer rotatable elements 10—11 are each suspended for independent rotation with respect to the frame 12 and on the same axis. The inner rotatable element 11 is again keyed at 11' to the shaft 13, which is used for delivery of output torque. In the form shown, both the inner motor element 19 and the inner clutch element 21 are carried on the same rotary support 50, and a one-way engaging brake, such as a roller operated brake mechanism 52, determines that the shaft 13 shall rotate in one and only one direction with respect to the frame 12. Excitation of the motor elements 18—19 is preferably such that the relative torque thereby developed drives the one-way-engaging brake 52 against the frame 12 so as to permit positive frame-referenced driving of the flywheel 10 to maximum speed whenever the rotation of shaft 13 has been reduced to zero.

The diagram of Figure 5 resembles that of Figure 2, except for the elimination of control connections to any brake; therefore, the same reference characters have again been employed. Basically, the program means 35 or the jog control 40 serve only to flip the relay means 36 one way or the other so as to excite either the motor 37 or the clutch 38, as the case may be.

In operation, and starting from rest, the motor is first excited and allowed to develop full (or substantially full) speed in the flywheel 10. Relay 36 is then operated to de-energize motor 37 and to excite clutch 38, thus substantially locking the flywheel 10 to the output shaft 13 and delivering torque to the load as long as the clutch remains excited. As soon as one of the means 35—40 determines that clutch action shall cease, relay 36 is reversed so as to re-energize motor 37 and to de-energize clutch 38. This will have the immediate effect of decelerating the shaft 13 and of reaccelerating the flywheel 10. Once the shaft speed has been reduced to zero, the one-way-engaging brake 52 derives a solid reference against the frame 12, for the continued acceleration of flywheel 10, if necessary.

In the embodiments thus far described, it has not been particularly necessary that the output shaft 13 turn the same number of revolutions for each cycle of transient output-torque development; thus, in the arrangement of Figure 1 it is possible to tolerate the slip inherent in the operation of an eddy-current brake at 34, and in the arrangement of Figure 4 it is of no particular concern how many output-shaft revolutions shall have been developed before one-way brake 52 takes hold. For other applications, other configurations may be more desirable; some of these are suggested by the forms of Figures 6 to 9, in which corresponding parts have been given the same reference numerals.

In the embodiment of Figure 6, the motor elements 18—19 and the clutch elements 21—29—30 may be as described for Figures 1 and 4. However, positive brake action is available through employment of friction-brake means 55. The brake shown at 55 involves a disc member 56 keyed at 57 to the shaft 13 and therefore forming part of the inner rotatable member 11. Friction material for engagement with disc 56 is mounted on the opposed active faces of an annular movable shoe member 58 and of a reaction shoe member 59, both of which are carried by the frame 12 and therefore do not rotate. The brake 55 happens to be of the pneumatically actuated variety having a preloaded compression spring to apply braking effort whenever control pressure is relieved at the tail end of a piston 60. Actuating means 61 for brake 55 may function in response to trip means 62, which is shown to have a direct mechanical connection to the output shaft 13.

The device of Figure 6 is particularly useful in power-press applications wherein a given number of output-shaft rotations are to be developed for each cycle of operation. The trip means 62 may in such case be viewed as a revolutions counter or as a limit switch on the driven machine and responsive, for example, to attainment of top-center position, it being understood that program means 35 (Figure 2) is effective to determine the substantial part of the decelerating phase 44' (Figure 3) prior to attainment of the top-center position, so that the actual braking effort required to positively stop (and hold) the mechanism by means of brake 55 will be minimal.

In the embodiment of Figure 7, a friction clutch 65 replaces the previously described eddy-current clutch, and it is important to note that the clutch 65 is separate and apart from the brake 55 of Figure 7, as distinguished from more conventional friction clutch-brake applications to a flywheel, wherein clutch and brake functions are directly interlocked. The friction clutch 65 may involve a disc member 66 secured to the outer rotatable member 10 and friction-shoe parts 67—68 may be fixed to the inner rotatable member 11, as by keying the same at 69 to shaft 13. Clutch 65 may also be pneumatically operated; as shown, a preloaded compression spring normally urges piston 68 in the clutch-disengaging direction, and pneumatic pressure overrides the spring bias to actuate the clutch. Sequencing of control functions for the members 18—19 and 55—65 of Figure 7 may be as described for the corresponding parts of Figures 1 and 6.

Figure 8 resembles Figure 1 in all functional respects except for the additional provision of the friction brake 55, in order to provide a positive holding to the frame when necessary, as in press operations. The device of Figure 8 thus includes motor elements 18—19 and eddy-current clutch elements 21—29—30 on the rotatable members 10—11, and eddy-current brake means 34 as well as friction-brake means 55 between the output member 11 and the frame. In terms of the general cycle of operation described above for Figures 1, 6, and 7, the clutch elements 21—29—30 are still the means of output-torque development, motor elements 18—19 are the means of substantial momentum reduction in the output shaft 13, brake 55 is the means of positively holding the shaft 13 once the desired output displacement has taken place, and brake 34 is a slip device actuated prior to actuation of brake 55, as in response to slow-speed responsive means 43 (Figure 1). Brake 34 may therefore serve the function, when necessary, of permitting slow-speed output-shaft rotation, following major output deceleration by motoring action and prior to attainment of the output-shaft position at which friction brake 55 is actuated.

Figure 9 functionally resembles the structure of Figure 4 except that it illustrates applicability of the invention in situations other than those involving inner and outer relatively rotating members 10—11. In Figure 9, the members 10—11 are of substantially the same radial proportions and axially face each other. The input member 10 is formed with a flywheel portion 20 and carries motor element 18, facing the coacting motor portion 19 on the output member 11. Eddy-current clutch elements 21 and 29—30 on members 10—11 also face each other across a gap in a radial plane, and the one-way-engaging brake 52 automatically provides a frame-based reference for shaft 13 whenever motoring action has reduced output-shaft rotation to zero.

For purposes of simplified discussion, each of the described embodiments has been treated for the case of positive-torque transmission, that is, for the situation in which clutch actuation develops output torque, and in which motoring action substantially kills output momentum. Actually, however, and as indicated generally above, the invention is of broader application, as for the development of negative-torque transmission, particularly for the embodiments of Figures 1, 6, 7, and 8. In the development of negative output torque, the normal momentum of the flywheel is based on a motor-element speed representing less than "full" (or maximum) motor speed, as automatically governed by speed-limiting means 70 (Figures 6–7–8) referenced to the frame 12 and driven by pick-off from the input rotatable member or flywheel 10. Negative output torques are developed by transiently overriding the speed-limiting means 70, by further energizing the motor elements, while the clutch elements are not actuated. After delivery of the desired transient negative torque to the load, the motor elements are deenergized and the clutch elements are actuated. These functions will be more clear from a consideration of Figure 10.

Figure 10 illustrates an operative cycle of the torque-transmitting mechanism for the case of negative output torque. As for the positive-torque case of Figure 3, the motor 37 and brake 34 are both initially energized to permit acceleration of the flywheel 10 to normal running speed; shaded bars 71 and 72 suggest this starting phase, and cut-off of motor 37 at instant 73 suggests automatic operation of the speed-limiting means 70 when running speed has developed in the flywheel. At a subsequent instant of time 75, determined by program means 74 (to be described, see Figure 11), brake 34 is released and motor 37 further energized at an excitation level sufficient to react the motor elements against the flywheel and thus to develop output-shaft rotation in a direction opposite to that of flywheel rotation; this phase is illustrated by bar 71' in Figure 10. Output-shaft deceleration may be initiated by a retarding-torque trip 76 at an instant 77 determined by the driven machine; this occurs upon de-energizing motor elements 37 and actuating clutch elements 38, as suggested by the shaded bar 78. At release of the brake trip 79, which may be displacement-responsive means or zero-speed-responsive means or both, at instant 80, the clutch elements 38 are decoupled, brake 34 is applied, and motor 37 is restored to control of the speed-limiting means 70.

Figure 11:
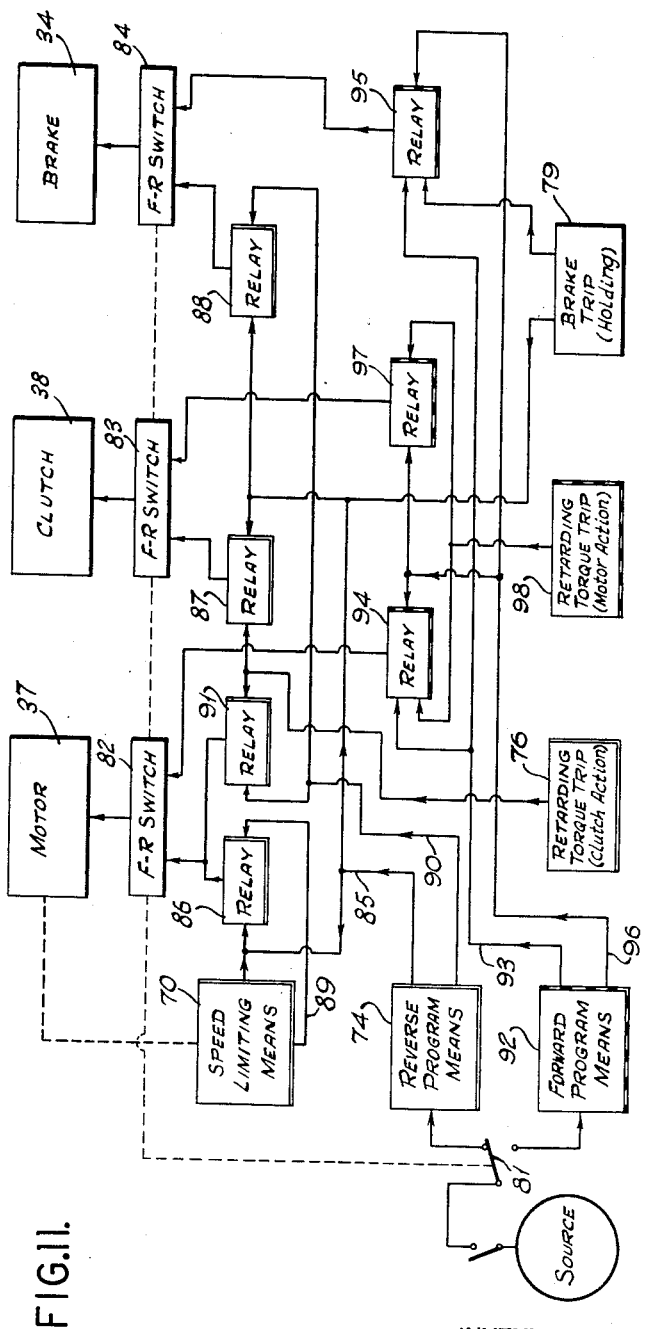

Figure 11 illustrates control connections for the motor, clutch and brake elements 37—38—34 of the various forms of our invention, with an indication of how positive-output torque or negative-output torque may be selectively available, depending upon the positioning of a selector switch 81. Separate switches 82—83—84 are ganged to the selector switch so as to render the motor, clutch and brake elements 37—38—34 selectively available for control to develop positive or negative output torque, as desired. To simplify the circuit of Figure 11 only control connections have been shown, and the power-supply leads to the various relays have been omitted; also most of the control elements determining negative-torque development are independent of those determining positive-torque development and therefore have been given characteristic shading to simplify a reading of Figure 11. For further simplicity of interpretation of Figure 11, a convention has been adopted for all relays, whereby control signals applied at the left side of the (relay) block govern relay actuation, and control signals applied at the right side of the block determine drop-out or de-energizing of the relay.

The negative-torque development program derives from reverse-program means 74, and when the system is started from rest, a starting signal in line 85 is effective to actuate the motor-drive relay 86, and simultaneously to de-energize the clutch-control relay 87 and to actuate the brake-control relay 88. The relays 86—87—88 thus determine simultaneous energizing of the motor and brake, as indicated at 71—72 in Figure 10, whereby flywheel momentum may be developed in the input or flywheel member 10.

For purposes of negative-torque development, it is important that speed-limiting means 70 driven by the flywheel part 10 of the motor 37 shall run the motor elements at less than full speed, as for example, 80% of full speed. Connection 89 from speed-limiting means 70 suggests that upon attainment of the limiting speed in element 10 of motor 37, relay 86 is dropped out, thereby enabling element 10 to coast while brake 34 remains set. This function may occur at the instant 73, designated in Figure 10.

In the form shown, program means 74 includes a second output line 90 for handling voltages determining initiation of negative-torque development. At the onset of such voltage, motor overdrive relay 91 is actuated so as to run motor 37 independent of any regulation by speed-limiting means 70. At the same instant, the same voltage determines drop-out of the brake relay 88 so that motoring action involves delivery of negative output torque through reaction against the flywheel inertia in member 10. This will be accompanied by some small increase in speed of rotation of the flywheel member 10 with respect to the frame, but the principal speed development will be through negative-torque delivery at the output 13. The duration of negative-torque delivery may be determined by program means 74, but in the form shown, a separate retarding-torque trip 76, which may be a limit switch based on the driven machine, operates at instant 77 to drop out the motor overdrive relay 91 and at the same time to actuate the clutch relay 87. Clutching action then has the effect of retarding the output shaft and killing its momentum, all by reaction against or reference to the momentum of the flywheel member 10. Upon achievement of zero output-shaft speed, or of top-center position on the driven machine, or of some other brake-trip condition, the brake-trip means 79 is effective to drop out the clutch relay 87 and to reactivate the brake relay 88, thus reapplying the brake and rendering the motor once more under speed-limited control.

If the selector switch 81 and associated switches 82—83—84 should be thrown to the other position (selecting positive output-torque delivery), then a separate program means 92 is operative; program means 92 corresponds generally to the means 35 of Figure 2. When the system is started from rest, a first output 93 from the program means 92 delivers start-control voltage to simultaneously actuate the motor-control relay 94 and the brake-control relay 95, thus permitting development of flywheel momentum with respect to the frame. The delivery of positive torque in the shaft 13 is under the control of a second output 96 from program means 92.

At the onset of a control voltage in line 96, the motor-control relay 94 is dropped out, the brake-control relay 95 is dropped out, and the clutch-control relay 97 is actuated. Clutch action serves to deliver output-shaft rotation in the same direction as rotation of the flywheel member 10, and in the process of transferring kinetic energy from the flywheel member 10 to the output (including the load), there is some speed reduction in the flywheel member 10. Termination of positive torque delivery may be determined by a retarding-torque trip 98 analogous to that described at 76 for the case of negative-torque development, except that the output of trip 98 determines drop-out of clutch relay 97 and actuation of the motor-control relay 94. This permits the motor elements 18—19 to develop retarding torque for decelerating the output shaft while also restoring kinetic energy to the flywheel element 10. Upon attainment of zero output speed, or of top-center position, or of some other condition on the driven machine, the brake trip 79 may be effective to actuate brake relay 95, so that the brake 34 may hold the output shaft and provide a frame reference against which continued motoring action can serve to fully restore the flywheel member 10 to the desired running speed with respect to the frame.

It will be seen that we have described an improved prime-mover construction which may also be viewed as a torque-transmitting device. Importantly, our construction utilizes components which are readily available and yet achieves efficiencies hitherto unobtainable, largely because previous flywheel-clutch-brake combinations have had to rely on the brake (referenced to the frame) in order to kill output momentum; an important fraction of the energy of the system has thus been dissipated in frictional heat, which cannot be utilized.

On the other hand, for positive output-torque development, the motor elements of our construction are utilized to kill the output momentum and at the same time restore momentum to the flywheel; and for negative output-torque development, the clutch elements of our construction serve to kill the output momentum and at the same time restore the flywheel to its desired running momentum. In both cases, there is inherent avoidance of energy losses occasioned by needless reference to the frame. In actual use, for positive output-torque development, it is frequently not necessary to excite the motor elements 18—19 longer than a time sufficient to restore a desired speed to the flywheel 10; this length of time may be less than a full operating cycle of the machine which is driven by our prime mover, so that speed-responsive means (not shown in Figure 2, but analogous to that at 70) following the speed of flywheel 10 may, if desired, automatically cut-off the excitation of motor elements 18—19.

Viewed as a torque transmitting device for positive output-torque development, our construction need utilize the motor elements 18—19 primarily only as a brake, i.e., to kill the output momentum. In such case, for example, belt-drive grooves 51 (which may be part of member 10 for any one of the forms shown) may be viewed as means whereby flywheel 10 may be continuously driven from an external source of torque, such as a continuously running electric motor. Output torque at shaft 13 is then available upon actuating clutch 38, and output momentum is killed upon exciting motor elements 18—19 (37). Once the output momentum is killed, there may be no need for further excitation of motor elements 18—19, so that elements 18—19 may be disconnected, and prime reliance may be had on the external source of torque to restore to the flywheel what little, if any, additional momentum is needed.

Similarly, and viewed as a torque-transmitting device for negative output-torque development, our construction need utilize motor elements 18—19 primarily only for efficient delivery of output torque. Again, the belt-drive grooves 51 are the means whereby flywheel 10 may be continuously driven from an external source of torque, such as a continuously running electric motor. Preferably, this continuously running speed represents for flywheel 10 (with respect to the frame) something less than full speed for motor elements 18—19. Output torque (negative) at shaft 13 is then available upon sufficiently energizing motor elements 18—19, and output momentum is killed upon exciting clutch 38. It will be noted that, as distinguished from an ordinary electric-motor drive wherein starting torque is relatively unfavorable at zero speed, the continuously running flywheel 10 provides a substantial inertia-referenced base against which relatively high initial torques may react for delivery at shaft 13; favorable initial torque is available because the motor elements 18—19 are already moving at relatively high speed (i.e., high on the speed-torque curve of motor elements 18—19) when motor elements 18—19 are excited. It will be noted that this initial favorable torque characteristic applies also for the prime-mover with negative torque development, as discussed in connection with program means 74 and Figure 10.

For simplicity, we have throughout the above discussion referred to excitation either of the motor elements 37 or of the clutch elements 38, because a clearer understanding results from the separate consideration of the functions of these parts. However, it will be appreciated that, under certain circumstances, it may be desirable to provide "simultaneous" or "overlapping" excitation of the elements 37—38. In such case, excitation of the motor and clutch elements 37—38 is preferably variably controllable, rather than either "on" or "off," as described above, and transfer from predominantly motor excitation (braking, for positive-torque development; clutching, for negative-torque development) to predominantly clutch control (clutching, for positive-torque development; braking, for negative-torque development) of the output shaft 13 may be on a "tightly controlled," faster-response basis. The terms "excitation," "energizing," "de-energizing," and the like, all as applied to the motor, clutch, and brake elements herein will thus be understood to be relative terms, meaning that the torque developed upon excitation of a particular element (e.g., motor 37 or clutch 38) shall predominate over the torque developed upon excitation of another element (e.g., clutch 38 or motor 37). Control means 35—40—74—92 and the various relay means in Figures 2 and 11 will be understood sufficiently to designate control means for effective output-torque development through simultaneous excitation of the motor and clutch elements 37—38, by merely determining which of these elements 37—38 shall develop the predominant torque at any one time; in this manner, full control, from full-speed forward, down to slow-speed forward, stop, and similarly in reverse is available depending upon the sequencing and relative magnitudes by which motor and clutch torques are caused to predominate.

While we have described the invention in detail for the preferred forms shown, it will be understood that modifications may be made within the scope of the invention, as defined in the claims which follow.

We claim:

1. A prime mover, comprising a frame, first and second relatively rotatable members mounted for independent rotation about the same axis on said frame, coacting electric-motor elements carried by said members, whereby said members may be driven in relative rotation upon excitation of said motor elements, coacting clutch elements independent of said motor elements and carried by said members, whereby relative rotation of said members may be retarded upon operation of said clutch elements, rotary-output means connected to one of said members, to the exclusion of the other, and one-way-engaging holding means for holding said one member against rotation in one direction, whereby the other of said members may be driven relatively to said frame upon excitation of said motor elements.

2. A prime mover, comprising a frame, first and second relatively rotatable members mounted for independent rotation about the same axis on said frame, coacting electric-motor elements carried by said members, whereby said members may be driven in relative rotation upon excitation of said motor elements, coacting clutch elements independent of said motor elements and carried by said members, whereby relative rotation of said members may be retarded upon operation of said clutch elements, selectively applicable brake means coacting between one of said members and said frame, and control means having a first condition in which said clutch elements are excited substantially to the exclusion of said motor elements and a second condition in which said motor elements are excited substantially to the exclusion of said clutch elements, said control means including means responsive to attainment of substantially reduced speed of said one member relatively to said frame and in controlling relation with application of said brake means, whereby upon application of said brake means the other of said members may be driven relatively to said frame with continued excitation of said motor elements.

3. A prime mover, comprising a frame, first and second relatively rotatable members mounted for independent rotation about the same axis on said frame, coacting electric-motor elements carried by said members, whereby said members may be driven in relative rotation upon excitation of said motor elements, coacting clutch elements separate from said motor elements and carried by said members, whereby relative rotation of said members may be retarded upon operation of said clutch elements, and one-way-engaging brake means coacting between one of said members and said frame, the engaging direction of said one-way-engaging brake means being such as to provide a reference for said one member to said frame upon excitation of said motor elements so that the other of said members may be driven relatively to said frame upon excitation of said motor elements.

4. A prime mover, comprising a frame, first and second relatively rotatable members mounted for independent rotation about the same axis, the first of said members comprising separate motor and clutch elements, the second of said members being adapted for connection to a load and comprising separate motor and clutch elements, said motor elements and said clutch elements being disposed for coaction and the moment of inertia of said first member substantially exceeding the moment of inertia of said second member, whereby when connected to a load and upon excitation of said motor elements said first member will be accelerated reactively against the load to develop flywheel momentum in said first member, control means having a first condition in which said clutch elements are excited more than said motor elements and a second condition in which said motor elements are excited more than said clutch elements, whereby upon thereafter operating said control means selectively between said first and second conditions, positive and negative torques referenced to instantaneous flywheel momentum may be transferred to said load.

5. A prime mover, comprising a frame, first and second relatively rotatable members mounted for independent rotation about the same axis on said frame, the first of said members comprising separate motor and clutch elements, the second of said members being adapted for connection to a load and comprising separate motor and clutch elements, said motor elements and said clutch elements being disposed for coaction and the moment of inertia of said first member substantially exceeding the moment of inertia of said second member, whereby when connected to a load and upon excitation of said motor elements said first member will be accelerated reactively against the load to develop flywheel momentum in said second member, control means having a first condition effectively disconnecting excitation of said motor elements and connecting said clutch elements for excitation, whereby upon operating said control means in said first condition flywheel momentum will be transferred to said load, and said control means including means for energizing said motor elements following actuation of said clutch elements, whereby upon re-energizing said motor elements after deactivating said clutch elements the reactive torques due to motoring will be effective simultaneously to decelerate said second member and to reaccelerate said first member.

6. A prime mover, comprising a frame, first and second relatively rotatable members mounted for independent rotation about the same axis on said frame, the first of said members comprising separate motor and clutch elements, the second of said members being adapted for connection to a load and comprising separate motor and clutch elements, said motor elements and said clutch elements being disposed for coaction and the moment of inertia of said first member substantially exceeding the moment of inertia of said second member, speed-responsive means responsive to attainment of a given speed of said first member relative to said frame and in controlling relation with said motor elements, whereby when connected to a load and upon excitation of said motor elements, said first member will be accelerated reactively against the load to develop a first flywheel-momentum condition in said first member at substantially said given speed, control means effectively overriding said speed-responsive means and connected for further excitation of said motor elements, whereby upon thereafter further energizing said motor elements, high negative torque may be transferred to said load, and said control means including means for actuating said clutch elements following excitation of said motor elements, whereby upon actuating said clutch elements after de-energizing said motor elements the reactive torques due to clutching will be effective simultaneously to decelerate said second member and to restore said first member substantially to said first momentum condition.

7. A prime mover, comprising first and second relatively rotatable members each mounted for rotation about the same axis, coacting electric-motor elements carried by said members, separate coacting eddy-current clutch elements carried by said members, rotary output means connected to one of said members to the exclusion of the other of said members, and means selectively predominantly exciting said motor elements and said clutch elements in alternation with each other.

8. A prime mover, comprising first and second relatively rotatable members each mounted for rotation about the same axis, coacting electric-motor elements carried by said members, separate coacting friction-clutch elements carried by said members, rotary output means connected to one of said members to the exclusion of the other of said members, and means selectively predominantly exciting said motor elements and said clutch elements in alternation with each other.

9. A prime mover, comprising a frame, first and second relatively rotatable members each mounted for rotation about the same axis on said frame, coacting electric-motor elements carried by said members, separate coacting clutch elements carried by said members, rotary-output means connected to one of said members to the exclusion of the other of said members, means selectively predominantly exciting said motor elements and said clutch elements in alternation with each other, and one-way-engaging brake means coacting between said one member and said frame.

10. A prime mover comprising a frame, first and second relatively rotatable members each mounted for rotation about the same axis on said frame, coacting electric-motor elements carried by said members, whereby said members may be accelerated in relative rotation upon excitation of said motor elements, separate coacting clutch elements carried by said members, whereby relative rotation of said members may be retarded upon operation of said clutch elements, brake elements coacting between one of said members and said frame, speed-responsive means responsive to a predetermined reduction in speed of said one member with respect to said frame, and a control connection between said speed-responsive means and said brake element, whereby upon excitation of said motor elements after deactivating said clutch means, the action of said motor elements may substantially reduce rotational speed of said one member so that, when said speed-responsive means thereafter detects substantially reduced speed of said one member, said brake may be automatically applied to hold said one member against rotation and thus to permit the other of said members to be driven at full speed relative to said frame in order to condition said prime mover for recycled operation.

11. A prime mover, comprising a frame, first and second relatively rotatable members each mounted for rotation about the same axis on said frame, coacting electric-motor elements carried by said members, whereby said members may be driven in relative rotation upon excitation of said motor elements, coacting cluch elements separate from said motor elements and carried by said members, whereby relative rotation of said members may be retarded upon operation of said clutch elements, brake elements coacting between one of said members and said frame, speed-responsive means responsive to a particular speed of said other member with respect to said frame and in controlling relation with said motor elements, and control means effective after deceleration of said one member for actuating said brake elements.

12. A prime mover, comprising a frame, first and second relatively rotatable members each mounted for rotation about the same axis on said frame, coacting electric-motor elements carried by said members, coacting clutch elements separate from said motor elements and carried by said members, speed-responsive means responsive to a particular speed of one of said members with respect to said frame and in controlling relation with said motor elements, said particular speed being less than full speed of said motor elements, control means effective to override the control of said speed-responsive means and to excite said motor elements, and means alternately predominantly exciting said control means and actuating said clutch elements.

13. A prime mover, comprising a frame, first and second relatively rotatable members each mounted for rotation about the same axis on said frame, coacting electric-motor elements carried by said members, whereby said members may be driven in relative rotation upon excitation of said motor elements, coacting clutch elements separate from said motor elements and carried by said members, whereby relative rotation of said members may be retarded upon operation of said clutch elements, brake means coacting between one of said members and said frame, whereby the other of said members may be driven relatively to said frame upon excitation of said motor elements, means disengaging said brake means and de-energizing said motor elements and thereafter actuating said clutch elements, whereby flywheel energy in said other member may be quickly transferred to said one member, means thereafter disengaging said clutch elements and re-energizing said motor elements, whereby said one member is decelerated and said other member is re-accelerated, and means for actuating said brake means at a time subsequent to the re-energizing of said motor elements, whereby said brake means is not applied until said one member has been decelerated by said motor elements.

14. A prime mover, comprising a frame, first and second relatively rotatable members, each mounted for rotation about the same axis on said frame, coacting electric-motor elements carried by said members, coacting eddy-current clutch elements carried by said members, speed-responsive means responsive to rotation of one of said members with respect to said frame, and coacting eddy-current brake elements carried by said one of said members and by said frame, said speed-responsive means being operatively connected to excite said brake elements upon detection of substantially reduced speed of said one member.

15. A prime mover, comprising a frame, first and second relatively rotatable members, each mounted for rotation about the same axis on said frame, coacting electric-motor elements carried by said members, separate coacting clutch elements carried by said members, speed-responsive means responsive to rotation of one of said members with respect to said frame, co-acting eddy-current brake elements carried by said one member and by said frame, said speed-responsive means being operatively connected to excite said eddy-current brake elements upon detection of substantially reduced speed of said one member, and coacting friction-brake elements carried by said one member and by said frame and operatively engaged upon attainment of a given position of said one member.

16. A prime mover according to claim 15, in which said clutch elements are of the eddy-current variety, the eddy-current member on said one member being common to said eddy-current clutch and to said eddy-current brake.

17. A prime mover, comprising a frame, first and second relatively rotatable members mounted for rotation about the same axis on said frame, coacting electric-motor elements carried by said members, coacting friction-clutch elements carried by said members, speed-responsive means responsive to rotation of one of said members with respect to said frame, and coacting friction-brake elements carried by said one member and by said frame, said speed-responsive means being operatively connected to engage said friction-brake elements upon detection of substantially reduced speed of said one member.

18. A torque-transmitting device, comprising first and second relatively rotatable members adapted for separate rotation on the same axis, one of said members having substantially greater moment of inertia about said axis than the other of said members, means for continuously rotating said one member from an external source of torque, coacting electric-motor elements on said members for developing an accelerating torque therebetween, coacting clutch elements on said members and separate from said motor elements for developing a decelerating torque therebetween, and selectively operable means for exciting said motor elements and actuating said clutch elements.

19. In a device of the character indicated, first and second relatively rotatable members mounted for rotation about the same axis on said frame, one of said members having substantially greater moment of inertia than the other of said members, coacting electric-motor elements carried by said members for developing accelerating torques between said members, coacting clutch elements separate from said motor elements and carried by said members for developing decelerating torques between said members, and means for simultaneously exciting said motor and clutch elements, said last-defined means including means for selectively controlling the relative magnitude of excitation of said motor and clutch elements, whereby the direction of torque change in said other member may be selectively controlled.

20. A prime mover, comprising a frame, first and second relatively rotatable members mounted for independent rotation about the same axis on said frame, co-acting electric motor elements carried by said members, co-acting eddy-current clutch elements carried by said members, rotary output means connected to one of said members to the exclusion of the other of said members, and co-acting friction brake elements carried by one of said members and by said frame.

21. A prime mover, comprising a frame, first and second relatively rotatable members mounted for independent rotation about the same axis on said frame, co-acting electric motor elements carried by said members, co-acting eddy-current clutch elements carried by said members, rotary output means connected to one of said members to the exclusion of the other of said members, and one-way engaging brake elements carried by one of said members and by said frame.

22. A drive for supplying intermittent torques to a load comprising: a frame; a shaft journaled for rotation in said frame and drivingly connected to said load; a flywheel journaled for rotation with respect to said shaft; co-acting electric motor elements carried by said shaft and said flywheel and adapted to produce a repulsion torque therebetween; friction clutch means to drivingly connect said flywheel to said shaft; and friction brake means to brake said shaft to said frame.

23. A drive for supplying intermittent torques to a load comprising: a frame; a shaft journaled for rotation in said frame and drivingly connected to said load; a flywheel journaled for independent rotation about said shaft; co-acting electric motor elements carried by said shaft and said flywheel and adapted to produce a repulsion torque therebetween; eddy-current clutch means to drivingly connect said flywheel to said shaft; and friction brake means to brake said shaft to said frame.

24. A drive for supplying intermittent torques to a load comprising: a frame; a shaft journaled for rotation in said frame and drivingly connected to said load; a flywheel journaled about said shaft for rotation independent of said shaft; coacting electric-motor elements carried by said shaft and said flywheel and adapted to produce a repulsion torque therebetween; eddy-current clutch means to drivingly connect said flywheel to said shaft; and eddy-current brake means to brake said shaft to said frame.

25. A drive for supplying intermittent torques to a load comprising: a frame; a shaft journaled for rotation in said frame and drivingly connected to said load; a flywheel journaled for independent rotation about said shaft; co-acting electric motor elements carried by said shaft and said flywheel and adapted to produce a repulsion torque therebetween; eddy-current clutch means to drivingly connect said flywheel to said shaft; eddy-current brake means to brake said shaft to said frame; and friction brake means to brake said shaft to said frame.

26. A drive for supplying intermittent torques to a load comprising: a frame; a shaft journaled for rotation with respect to said frame and drivingly connected to said load; a flywheel journaled for independent rotation about and with respect to said shaft; co-acting electric motor elements carried by said shaft and said flywheel and adapted to produce a repulsion torque therebetween; eddy-current clutch means to drivingly connect said flywheel to said shaft; and one way engaging brake means to prevent rotation in one direction of said shaft relative to said frame.

References Cited in the file of this patent

UNITED STATES PATENTS

| | | |
|---|---|---|
| 600,446 | Pole | Mar. 8, 1898 |
| 739,096 | De Lignieres | Sept. 15, 1903 |
| 1,179,779 | Uhl | Apr. 18, 1916 |
| 1,511,492 | Aspden | Oct. 14, 1924 |
| 1,595,717 | Giannattasio | Aug. 10, 1926 |
| 1,767,916 | Coleman | June 24, 1930 |
| 2,246,372 | Lockwood | June 17, 1941 |
| 2,630,467 | Winther | Mar. 3, 1953 |

FOREIGN PATENTS

| | | |
|---|---|---|
| 20,513 | Great Britain | of 1896 |
| 1,030,511 | France | Mar. 11, 1953 |